United States Patent
Kotecha

(10) Patent No.: US 10,111,232 B2
(45) Date of Patent: *Oct. 23, 2018

(54) CHANNEL RANK UPDATES IN MULTIPLE-INPUT MULTIPLE-OUTPUT COMMUNICATION SYSTEMS

(71) Applicant: Apple Inc., Cupertino, CA (US)

(72) Inventor: Jayesh H. Kotecha, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/664,346

(22) Filed: Jul. 31, 2017

(65) Prior Publication Data

US 2018/0014308 A1    Jan. 11, 2018

Related U.S. Application Data

(63) Continuation of application No. 14/830,917, filed on Aug. 20, 2015, now Pat. No. 9,723,615, which is a continuation of application No. 14/147,911, filed on Jan. 6, 2014, now Pat. No. 9,119,193, which is a continuation of application No. 12/891,160, filed on Sep. 27, 2010, now Pat. No. 8,626,222, which is a continuation of application No. 12/053,577, filed on Mar. 22, 2008, now Pat. No. 7,978,623.

(51) Int. Cl.
| | |
|---|---|
| *H04W 72/06* | (2009.01) |
| *H04W 24/10* | (2009.01) |
| *H04W 72/04* | (2009.01) |
| *H04B 7/06* | (2006.01) |

(52) U.S. Cl.
CPC ............ *H04W 72/06* (2013.01); *H04B 7/063* (2013.01); *H04W 24/10* (2013.01); *H04W 72/0413* (2013.01)

(58) Field of Classification Search
CPC ......... H04L 47/70; H04L 47/72; H04L 47/74; H04L 47/78; H04L 47/80; H04L 47/10; H04W 28/0205; H04W 28/021; H04W 28/0247; H04W 28/0252; H04W 28/0257; H04W 28/0263; H04W 28/0268; H04W 28/0273; H04W 28/02; H04B 17/00; H04B 3/46
USPC ................ 370/230–235, 252, 253, 328–349; 455/62, 631.1
See application file for complete search history.

(56) References Cited

U.S. PATENT DOCUMENTS

| | | |
|---|---|---|
| 7,283,997 B1 | 10/2007 | Howard, Jr. et al. |
| 7,978,623 B1 | 7/2011 | Kotecha |
| 8,233,939 B2 | 7/2012 | Li et al. |
| 8,295,778 B2 | 10/2012 | Kotecha et al. |
| 8,417,190 B2 | 4/2013 | Sun et al. |
| 8,626,222 B2 | 1/2014 | Kotecha |
| 2008/0069031 A1 | 3/2008 | Zhang et al. |

(Continued)

*Primary Examiner* — Dady Chery
(74) *Attorney, Agent, or Firm* — Meyertons, Hood, Kivlin, Kowert & Goetzel, P.C.

(57) ABSTRACT

Embodiments of the disclosure provide a system and method for providing channel feedback information (CFI) from a user equipment device to a base station. CFI is transmitted from the user equipment device on first and second communication channels. The user equipment device is operable to measure the channel rank of a downlink channel and to select a preferred channel rank that is used to configure the CFI that is transmitted to the base station. The base station is operable to use the preferred channel rank to interpret the CFI transmitted by the user end device.

16 Claims, 6 Drawing Sheets

(56) References Cited

U.S. PATENT DOCUMENTS

| | | |
|---|---|---|
| 2008/0080459 A1 | 4/2008 | Kotecha et al. |
| 2008/0117815 A1 | 5/2008 | Kim et al. |
| 2008/0225792 A1 | 9/2008 | Naguib et al. |
| 2008/0229177 A1 | 9/2008 | Kotecha |
| 2009/0067391 A1 | 3/2009 | Shen et al. |
| 2009/0154588 A1 | 6/2009 | Chen et al. |
| 2009/0181691 A1 | 7/2009 | Kotecha et al. |
| 2009/0201861 A1 | 8/2009 | Kotecha |
| 2010/0172316 A1 | 7/2010 | Hwang et al. |
| 2010/0304691 A1 | 12/2010 | Goransson et al. |
| 2010/0315969 A1 | 12/2010 | Jongren et al. |
| 2011/0080965 A1 | 4/2011 | Liu et al. |
| 2012/0076033 A1 | 3/2012 | Mundarath et al. |
| 2012/0120823 A1 | 5/2012 | Kotecha |
| 2013/0044714 A1 | 2/2013 | Kotecha et al. |

CHANNEL RANK UPDATES IN MULTIPLE-INPUT MULTIPLE-OUTPUT COMMUNICATION SYSTEMS

PRIORITY CLAIM

This application is a continuation of and claims the benefit of priority from U.S. patent application Ser. No. 14/830,917, entitled "Channel Rank Updates to Multiple-Input Multiple-Output Communication Systems" and filed on Aug. 20, 2015, which is a continuation of and claims the benefit of priority from U.S. patent application Ser. No. 14/147,911, entitled "Channel Rank Updates in Multiple-Input Multiple-Output Communication Systems" and filed on Jan. 6, 2014 (issued as U.S. Pat. No. 9,119,193 on Aug. 25, 2015), which is a continuation of and claims the benefit of priority from U.S. patent application Ser. No. 12/891,160, entitled "Channel Rank Updates in Multiple-Input Multiple-Output Communication Systems" and filed on Sep. 27, 2010 (issued as U.S. Pat. No. 8,626,222 on Jan. 7, 2014), which is a continuation of and claims the benefit of priority from U.S. patent application Ser. No. 12/053,577, entitled "Channel Rank Updates in Multiple-Input Multiple-Output Communication Systems" and filed on Mar. 22, 2008 (issued as U.S. Pat. No. 7,978,623 on Jul. 12, 2011), each of which are fully incorporated herein by reference for all purposes to the extent not inconsistent with this application.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications."

FIELD OF THE INVENTION

The present invention is directed in general to the field of information processing. In one aspect, the present invention relates to a system and method for transmitting channel rank feedback information from one or more user equipment devices.

DESCRIPTION OF THE RELATED ART

Wireless communication systems transmit and receive signals within a designated electromagnetic frequency spectrum, but capacity of the electromagnetic frequency spectrum is limited. As the demand for wireless communication systems continues to expand, there are increasing challenges to improve spectrum usage efficiency. To improve the communication capacity of the systems while reducing the sensitivity of the systems to noise and interference and limiting the power of the transmissions, a number of wireless communication techniques have been proposed, such as Multiple Input Multiple Output (MIMO), which is a transmission method involving multiple transmit antennas and multiple receive antennas. Such wireless communication systems are increasingly used to distribute or "broadcast" audio and/or video signals (programs) to a number of recipients ("listeners" or "viewers") that belong to a large group. An example of such a wireless system is the 3GPP LTE (Long Term Evolution) system depicted in FIG. 1, which schematically illustrates the architecture of an LTE wireless communication system 1. As depicted, the broadcast server 28 communicates through an EPC 26 (Evolved Packet Core) which is connected to one or more access gateways (AGW) 22, 24 that control transceiver devices, 2, 4, 6, 8 which communicate with the end user devices 10-15. In the LTE architecture, the transceiver devices 2, 4, 6, 8 may be implemented with base transceiver stations (sometimes referred to herein as enhanced "Node-B" or "eNB" devices) which in turn are coupled to Radio Network Controllers or access gateway (AGW) devices 22, 24 which make up the UMTS radio access network (collectively referred to as the UMTS Terrestrial Radio Access Network (UTRAN)). Each transceiver device 2, 4, 6, 8 includes transmit and receive circuitry that is used to communicate directly with any mobile end user(s) 10-15 located in each transceiver device's respective cell region. Thus, transceiver device 2 includes a cell region 3 having one or more sectors in which one or more mobile end users 13, 14 are located. Similarly, transceiver device 4 includes a cell region 5 having one or more sectors in which one or more mobile end users 15 are located, transceiver device 6 includes a cell region 7 having one or more sectors in which one or more mobile end users 10, 11 are located, and transceiver device 8 includes a cell region 9 having one or more sectors in which one or more mobile end users 12 are located. With the LTE architecture, the eNBs 2, 4, 6, 8 are connected by an S1 interface to the EPC 26, where the S1 interface supports a many-to-many relation between AGWs 22, 24 and the eNBs 2, 4, 6, 8.

As will be appreciated, each transceiver device, e.g., eNB 2, in the wireless communication system 1 includes a transmit antenna array and communicates with a user equipment device device, e.g., user equipment (UE) 15, having a receive antenna array, where each antenna array includes one or more antennas. The wireless communication system 1 may be any type of wireless communication system, including but not limited to a MIMO system, SDMA system, CDMA system, SC-FDMA system, OFDMA system, OFDM system, etc. Of course, the user equipment devices, e.g., UE 15, can also transmit signals which are received by the Node-B, e.g., eNB 2. The signals communicated between transmitter 102 and user equipment device 104 can include voice, data, electronic mail, video, and other data, voice, and video signals.

Various transmission strategies require the Node-B to have some level of knowledge concerning the channel response between the Node-B and each user equipment device, and are often referred to as "closed-loop" systems. An example application of closed-loop systems which exploit channel-side information at the Node-B (transmitter) ("CSIT") are precoding systems, such as space division multiple access (SDMA), which use closed-loop systems to improve spectrum usage efficiency by applying precoding at the Node-B to take into account the transmission channel characteristics, thereby improving data rates and link reliability. SDMA based methods have been adopted in several current emerging standards such as IEEE 802.16 and the 3rd Generation Partnership Project (3GPP) Long Term Evolution (LTE) platform. With such precoding systems, CSIT can be used with a variety of communication techniques to operate on the transmit signal before transmitting from the transmit antenna array. For example, precoding techniques can provide a multi-mode beamformer function to optimally match the input signal on one side to the channel on the other side. In situations where channel conditions can be provided to the Node-B, closed loop methods, such as MIMO precoding, can be used. Precoding techniques may be used to decouple the transmit signal into orthogonal spatial stream/beams, and additionally may be used to send more power along the beams where the channel is strong, but less or no power along the weak, thus enhancing system performance by improving data rates and link reliability. In addition to multi-stream transmission and power allocation techniques, adaptive modulation and coding (AMC) techniques can use CSIT to operate on the transmit signal before transmission on the transmit array.

With conventional closed-loop MIMO systems, full broadband channel knowledge at the Node-B may be obtained by using uplink sounding techniques (e.g., with Time Division Duplexing (TDD) systems). Alternatively, channel feedback techniques can be used with MIMO systems (e.g., with TDD or Frequency Division Duplexing (FDD) systems) to feed back channel information to the Node-B.

In the current LTE standard, channel quality information (CQI), precoding matrix index (PMI) and rank (collectively called channel feedback information (CFI)) can be fed back from the UE to the Node-B using one of two channels. One of the channels is the physical uplink control channel (PUCCH); the other channel is the physical uplink shared channel (PUSCH). The Node-B interprets CQI/PMI feedback transmitted on each of these channels based on the rank feedback. However, the behavior with respect to rank is not specified for situations where CQI/PMI feedback information is being transmitted on both the PUCCH and the PUSCH channels. For example, at various times, the rank indicated for feedback information transmitted in the PUSCH channel may be different than the rank indicated for feedback information transmitted the PUCCH channel. Currently there is no methodology to specify the behavior of the UE and Node-B for situations where rank indicated for feedback information transmitted in the PUSCH channel is different than the rank indicated for feedback information transmitted the PUCCH channel.

Accordingly, an efficient feedback methodology is needed to provide channel feedback information to a Node-B using rank information. In particular there is a need for an improved system and method to specify the behavior of the UE and Node-B for situations where rank indicated for feedback information transmitted in the PUSCH channel is different than the rank indicated for feedback information transmitted the PUCCH channel. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

Figure 1:
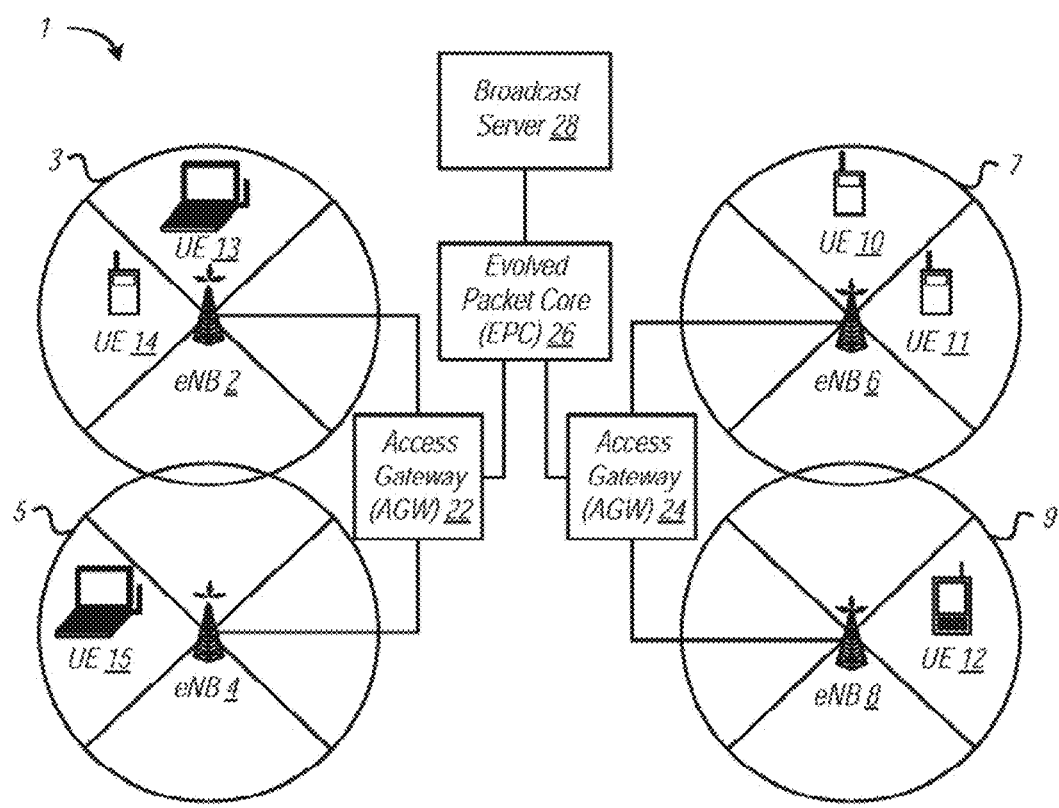
FIG. 1 schematically illustrates the architecture of an LTE wireless communication system.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

Embodiments of a system and methodology are disclosed for an efficient feedback methodology to provide channel feedback information to a Node-B using rank information. In particular, embodiments of the invention described herein provide an improved system and method to specify the behavior of the UE and Node-B for situations where rank indicated for feedback information transmitted in the PUSCH channel is different than the rank indicated for feedback information transmitted the PUCCH channel. In various embodiments of the invention as described herein, a channel rank feedback report from the user equipment device will be understood to constitute a request by the user equipment device to use a predetermined channel rank.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 2:
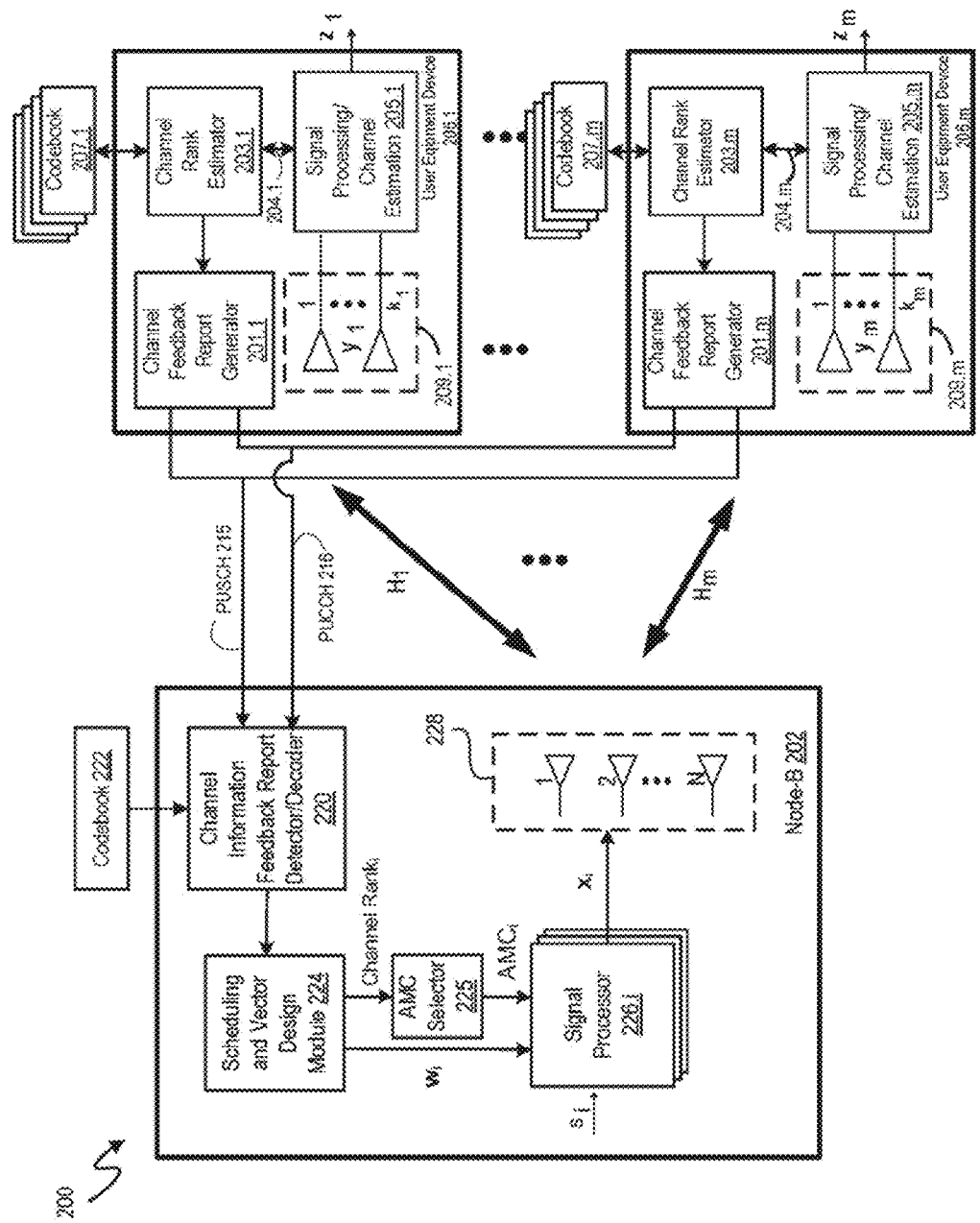
FIG. 2 depicts a wireless communication system in which one or more user equipment devices feed back information to a Node-B station for use in scheduling or otherwise precoding signal transmissions by the Node-B station.

FIG. 2 depicts a wireless communication system 200 in which a Node-B station 202 communicates with one or more user equipment devices 204.i. With reference to the LTE wireless system depicted in FIG. 1, the Node-B 202 may represent any of the control transceiver devices, 2, 4, 6, 8 which act as a base station, while the user equipment device 204.i may represent any of the end user devices 10-15. In the system 200 depicted in FIG. 2, one or more user equipment devices 206.i transmits channel feedback information, including channel rank, over PUSCH channel 215 and PUCCH channel 216 to a Node-B station 202 for use in scheduling or otherwise precoding signal transmissions by the Node-B station 202. At the Node-B 202, the channel feedback information is decoded and the rank is extracted and is used to configure or adapt one or more input signals that are transmitted from a Node-B 202 (e.g., a base station) to one or more user equipment devices 206.1-$m$ (e.g., subscriber stations). As will be appreciated, the Node-B station 202 and/or user equipment devices 206.$i$ include a processor, software executed by the processor, and other hardware that allow the processes used for communication and any other functions performed by the Node-B station 202 and each of user equipment devices 206.$i$. It will also be appreciated that the Node-B station 202 can both transmit signals (over the downlink path) and receive signals (over the uplink path), and that each user equipment device 204.$i$ can receive signals (over the downlink path) and transmit signals (over the uplink path).

The Node-B 202 includes an array 228 of one or more antennas for communicating with the user equipment devices 206.1 through 206.$m$, each of which includes an array 209.$i$ having one or more antennas for communicating with the Node-B 202. In operation, a data signal $s_i$, presented at the Node-B 202 for transmission to the user equipment device 204.$i$ is transformed by the signal processor 226.$i$ into a transmission signal, represented by the vector $x_i$. The signals transmitted from the transmit antenna 228 propagate through a matrix channel $H_i$ and are received by the receive antennas 209.$i$ where they are represented by the vector $y_i$. For a MIMO channel from the Node-B 202 to the $i^{th}$ user equipment device 206.$i$, the channel is denoted by $H_i$, $i \in \{1, 2, \ldots, m\}$. The channel matrix Hi may be represented as a $k_i \times N$ matrix of complex entries representing the complex coefficients of the transmission channel between each transmit-receive antenna pair, where N represents the number of transmit antennas in the transmit antenna array 228, and $k_i$ represents the number of antennas of the $i^{th}$ user equipment device 206.$i$. At the user equipment device 206.$i$, the signal processing unit 205.$i$ processes the $y_i$ signals received on the k antennas to obtain a data signal, $z_i$, which is an estimate of the transmitted data $s_i$. The processing of the received $y_i$ signals may include combining the yi signals with appropriate combining vector information $v_i$ retrieved from the codebook 207.$i$ or otherwise computed by the user equipment device's signal processing unit 205.$i$.

Precoding for downlink transmissions (Node-B to user equipment device) may be implemented by having each user equipment device 206.$i$ determine its MIMO channel matrix Hi—which specifies the profile of the transmission channel between a Node-B and an ith user equipment device—in the channel estimation signal processing unit 205.$i$. For example, in a MIMO implementation, each user equipment device 206.1-$m$ determines its MIMO channel matrix Hi by using pilot estimation or sounding techniques to determine or estimate the coefficients of the channel matrix Hi. Each user equipment device 206.$i$ uses the estimated MIMO channel matrix or other channel-related information (which can be channel coefficients or channel statistics or their functions, such as a precoder, a beamforming vector or a modulation order) to generate precoding information, such as precoding and power allocation values, appropriate for the MIMO channel matrix. This may be done by using the channel-related information to access a precoder stored in the user equipment device codebook 207.$i$. In addition, each user equipment device 206.$i$ uses the estimated MIMO channel matrix or other channel-related information to generate channel rank information that is to be used to configure/adapt the signals transmitted by the Node-B.

In one embodiment, the channel rank report generator 201.$i$ may include logic and/or circuitry for detecting a change in the mode of operation of the user equipment device 206.$i$ (e.g., from a single-antenna mode of operation to a multi-antenna mode of operation) so that channel rank information is generated and reported to the Node-B 202 only when such a mode change is detected. The channel estimation/signal processing unit 205.$is$ operable to monitor a downlink channel to obtain measurements of a plurality of channel parameters, including CQI, PMI and channel rank. A preferred rank is then selected for formatting CFI reports that are transmitted to the Node-B on a plurality of communication channels, e.g., a PUSCH and a PUCCH. In various embodiments of the invention, the CFI, including channel rank, may be fed back to the Node-B either at periodic time intervals or aperiodically. Furthermore, in various embodiments of the invention, the CFI, including channel rank, may be fed back to the Node-B in response to a request from the Node-B; or the CFI, including the channel rank, may be fed back to the Node-B autonomously by the user equipment device based on predetermined criteria.

Rather than feeding back the full channel rank representation, the user equipment device 206.$i$ may use a codebook 207.$i$ to compress or quantize the transmission profile (e.g., channel rank information) that is generated from the detected channel information and that can be used by the Node-B in controlling signal transmission to the user equipment device. The channel rank estimator 203.$i$ generates a quantization/codebook index by accessing the user equipment device codebook 207.$i$ which stores an indexed set of possible transmission profiles and/or channel matrices $H_i$, along with associated channel rank information so that the estimated channel matrix information 204.$i$ generated by the signal processing unit 205.$i$ can be used by the channel rank estimator 203.$i$ to retrieve a codebook index from the codebook 207.$i$. The output of the channel rank estimator 203.$i$ is provided to a channel rank report generator 201.$i$ that is operable to independently decide when to generate and feedback channel rank reports. For example, the channel rank report generator 201.$i$ may include a channel rank transition detector that detects a change in the channel rank information that meets a predetermined change threshold requirement so that channel rank information is generated and reported to the Node-B 202 via the feedback channel 215 only when the predetermined change threshold requirement is met. In another example, the channel rank report generator 201.$i$ may include logic and/or circuitry for detecting a change in the mode of operation of the user equipment device 206.$i$ (e.g., from a single-antenna mode of operation to a multi-antenna mode of operation) so that channel rank information is generated and reported to the Node-B 202 only when such a mode change is detected.

The channel feedback information is transmitted via the PUSCH channel 215 and the PUCCH channel 216 to the Node-B 202 where it may be stored and/or processed by the channel rank report detector/decoder 220. For example, a memory controller (not shown) in the channel rank report detector/decoder 220 may be used to update the previously reported channel rank information, either directly or using channel rank information retrieved from the codebook 222. In this way, the channel rank report detector/decoder 220 is operable to process the generated channel rank information to provide channel rank information that can be used by scheduling module 224 and AMC selection module 225 to generate scheduling or AMC information, respectively, for a particular user equipment device 206.$i$. As will be appreciated, the scheduling module 224 may be used to dynamically control which time/frequency resources are allocated to a certain user equipment device 206.$i$ at a given time. Downlink control signaling informs each user equipment device 206.*i* what resources and respective transmission formats have been allocated. The scheduling module 224 can instantaneously choose the best multiplexing strategy from the available methods (e.g., frequency localized or frequency distributed transmission). The flexibility in selecting resource blocks and multiplexing users will influence the available scheduling performance.

In general, embodiments of the invention pertain to communication systems in which the user end device feeds back CFI, including CQI, PMI and rank, in at least two modes of feedback which may be over two logical channels. In some embodiments of the invention the channel rank reported on each of the channels is interdependent and in some embodiments the ranks are the same. In other embodiments of the invention, the channel rank reported on the two channels is independent and, therefore, the two channels can have different channel ranks.

For example in one embodiment, the first logical channel, e.g., the PUCCH, is configured to feed back wideband CFI to be used for scheduling down link control information while the second logical channel, e.g., the PUSCH, is configured to feed back frequency selective CFI to be used for scheduling down link data. In this case, the rank feedback on these two reports are configured to be independent.

In another embodiment, the first logical channel, e.g., the PUCCH, is configured to feed back frequency selective CFI of a first type which may be used for scheduling down link data information while the second logical channel, e.g., the PUSCH, is configured to feed back frequency selective CFI of a second type which may be used for scheduling down link data. In this case, the rank feedbacks of these two reports are configured to be dependent. In this embodiment, it is possible that the rank observed by the user equipment device in the first set of CFI is different than the rank observed in the second set of CFI, in which case the user equipment device will select rank observed in the first set of CFI or the second set of CFI to be used for CFI reports on both channels. In one embodiment, the user equipment device may select the lower of the ranks of the two CFI sets as the choice of rank for both the feedback CFI sets.

Figure 3:
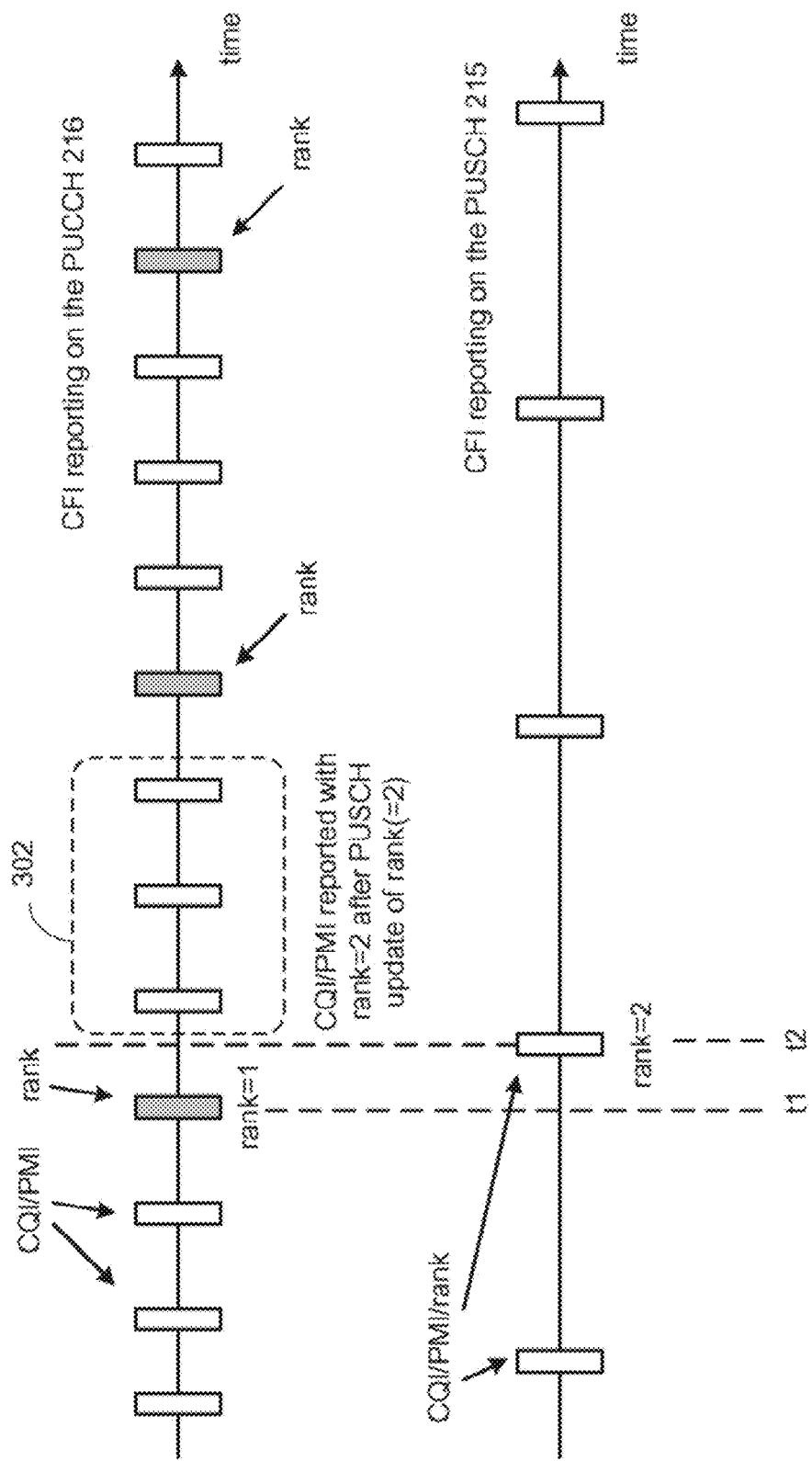
FIG. 3 is an illustration of the simultaneous transmission of channel feedback information on PUCCH and PUSCH channels in accordance with one embodiment of the invention.

FIG. 3 is an illustration of the simultaneous transmission of channel feedback information on a PUSCH channel 215 and a PUCCH channel 216 in accordance with one embodiment of the invention wherein the channel ranks on the two channels are dependent, i.e., set to be equal. The CFI transmitted on the PUCCH channel 216 is transmitted in a series of subframes with CQI and PMI information being transmitted together, with channel rank being transmitted in a separate subframe at predetermined intervals. For purposes of illustration, the CFI transmitted on the PUCCH channel 216 is shown to have a rank=1 at time t1. At time t2, however, the CFI transmitted on the PUSCH channel 215 is shown to have a rank=2. As will be understood by those of skill in the art, however, the current LTE standard does not provide a protocol for arbitrating between ranks when the rank is different for CFI transmitted on the PUSCH 215 and the PUCCH 216. In this embodiment of the invention, the rank reported on the two channels are interdependent on each other, i.e., at any time after a change in rank for either channel is detected, the ranks on the two CFI reporting modes on the PUSCH and PUCCH are identical. The user end device measures the rank for the two CFI reports and thereafter then the user end will choose a preferred rank to configure both the CFI reports. Thus, the latest preferred rank reported by CFI subframes either on the PUSCH or the PUCCH is used to interpret the CQI/PMI report on the PUCCH. Therefore, in this embodiment of the invention, the subsequently transmitted subframes 302 are processed using a rank=2.

To ensure reliability of the rank report on the PUCCH 216, the rank reported on the PUSCH 215 should be nearly as reliable or more reliable than the rank reported on the PUCCH 216. Also, since the rank and CQI/PMI reports are made on the same subframe on the PUSCH channel 215, the rank reported on the PUSCH 215 should be used to interpret the CQI/PMI on the PUSCH 215.

Figure 4:
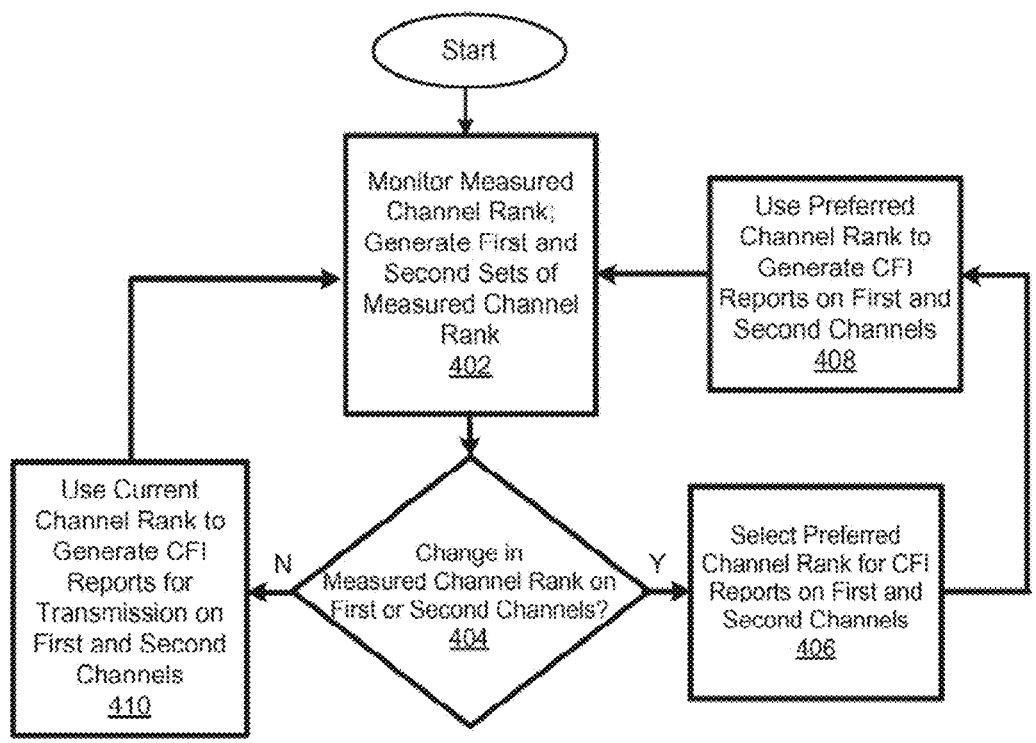
FIG. 4 is a flowchart illustration of processing steps for providing channel rank feedback information on first and second transmission channels wherein the channel ranks on the two channels are dependent.

FIG. 4 is a flowchart illustration of processing steps for providing channel rank feedback information on first and second transmission channels wherein the preferred channel ranks on the two channels are dependent. In step 402, the channel rank on a down link channel is monitored to generate first and second sets of measured channel rank. In step 404 a test is conducted to determine whether there has been a change in the measured channel rank of either of the first and second sets of measured channel rank. If the result of the test conducted in step 404 indicates that either of the measured channel ranks has changed, processing proceeds to step 406 wherein processing logic selects a preferred channel rank for formatting CFI reports on the first and second channels. Processing then proceeds to step 408, wherein the preferred channel rank is used to select the format for CFI reports transmitted on the first and second communication channels. Referring again to step 404, if the result of the test conducted in step 404 indicates that there is no change in the measured channel rank on the first and second channels, processing proceeds to step 410 wherein the current rank is used to select the format for CFI reports transmitted on the first and second transmission channels.

In some embodiments of the invention, rank updates on the two channels may be independent of each other, i.e., the rank reported on the PUSCH may be different than the rank reported on the PUCCH—this allows different CFI feedbacks to co-exist on the two channels. As an example, if the PUCCH has wideband CFI feedback and the PUSCH has user equipment device-selected CFI feedback, then the ranks for these two cases can be different. This implies that the rank reported on the PUSCH does not affect the CQI/PMI reported on the PUCCH; likewise the rank reported on the PUCCH does not affect the CQI/PMI reported on the PUSCH.

Figure 5:
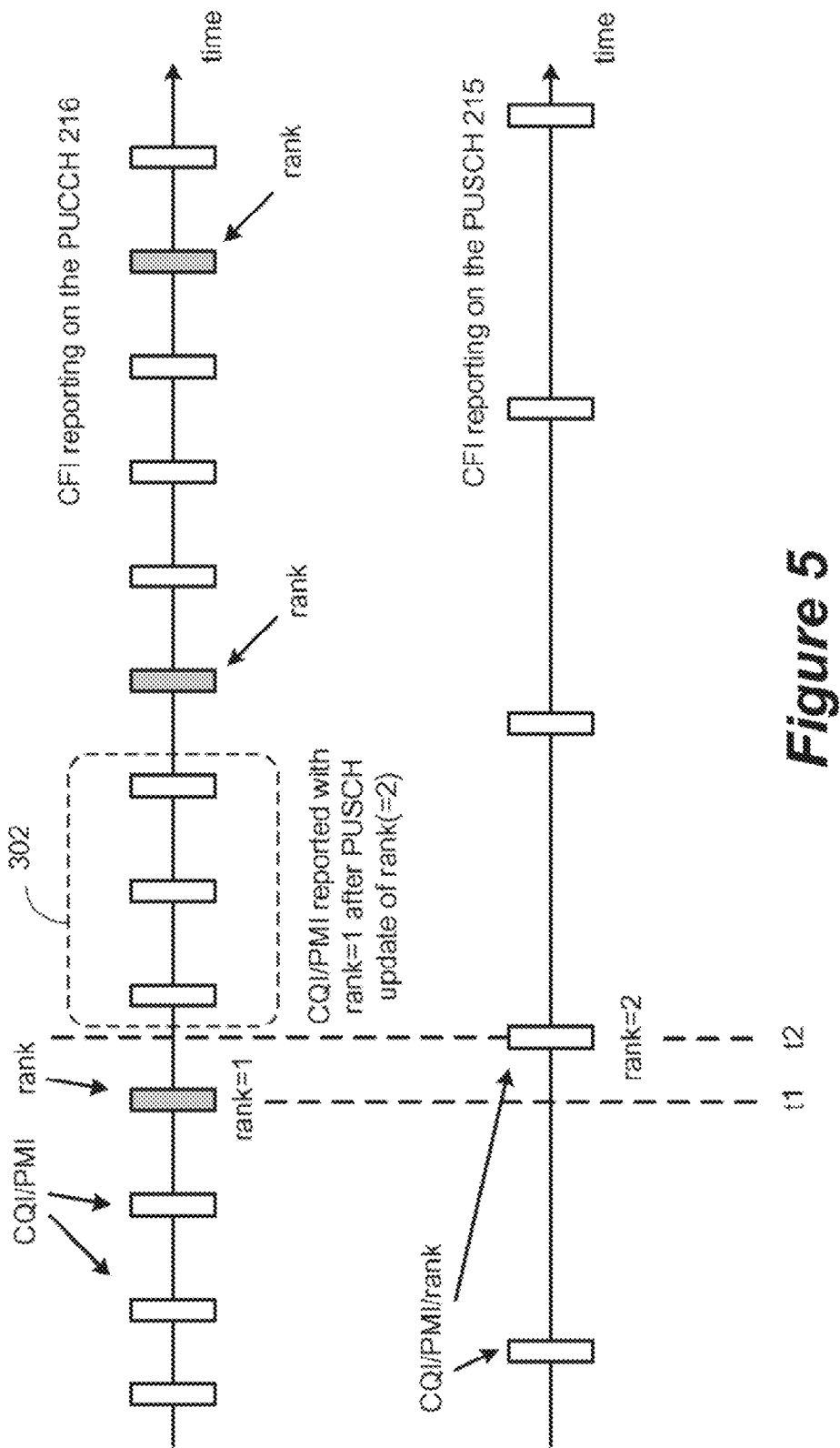
FIG. 5 is an illustration of the simultaneous transmission of channel feedback information on PUCCH and PUSCH channels in accordance with an alternate embodiment of the invention.

FIG. 5 is an illustration of the simultaneous transmission of channel feedback information on PUCCH and PUSCH channels in accordance with an alternate embodiment of the invention wherein the channel ranks for the two channels are independent. Again, for purposes of illustration, the CFI transmitted on the PUCCH channel 216 is shown to have a rank=1 at time t1. At time t2, however, the CFI transmitted on the PUSCH channel 215 is shown to have a rank=2. In this embodiment of the invention, ranks reported on the two channels are not dependent on each other, i.e., at any instant of time, the rank on the two CFI reporting modes on the PUSCH and PUCCH may not be identical. Thus, the latest rank reported by CFI subframes on the PUSCH is used to interpret the CQI/PMI report on the PUSCH and the latest rank reported by CFI subframes on the PUCCH is used is used to interpret the CQI/PMI report on the PUCCH. Therefore, in this embodiment of the invention, the subsequently transmitted subframes 302 are processed using a rank=1.

Figure 6:
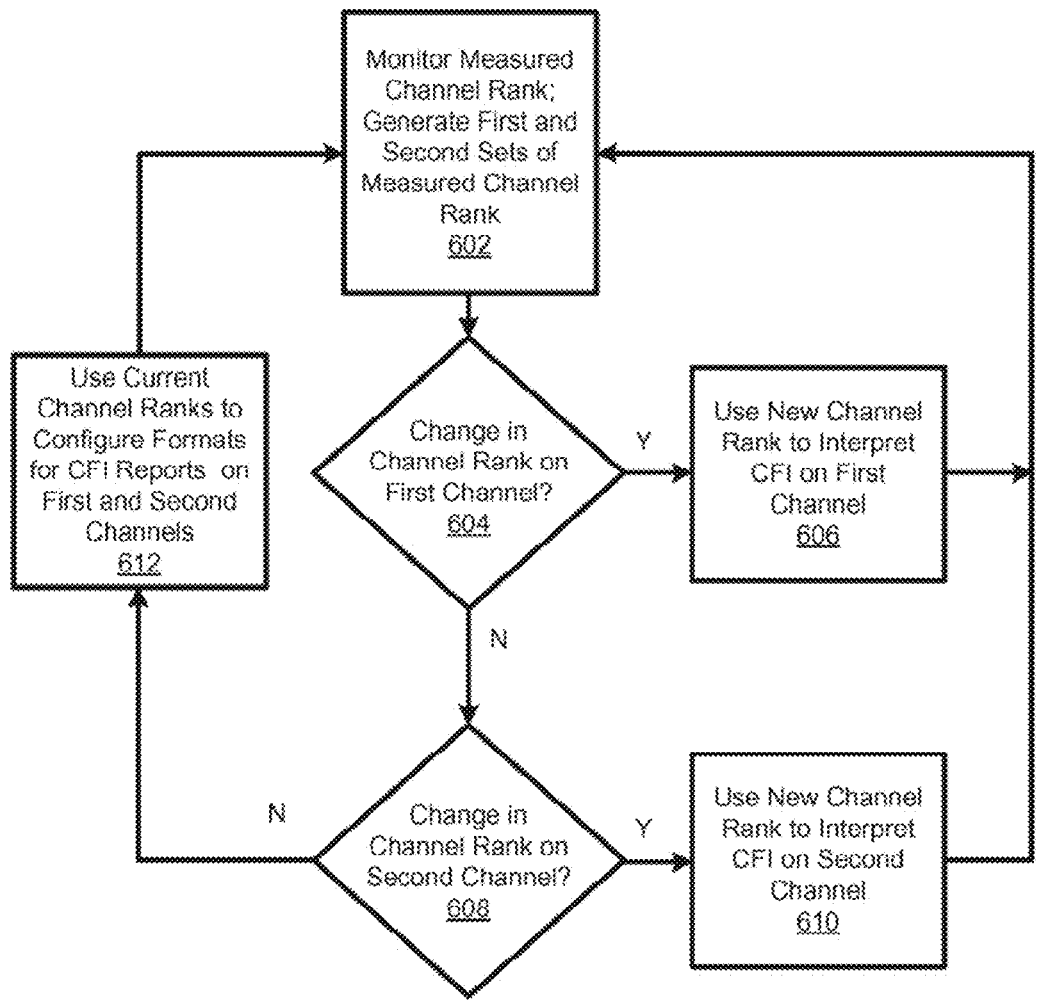
FIG. 6 is a flowchart illustration of processing steps for providing channel rank feedback information on first and second transmission channels wherein the channel ranks on the two channels are independent.

FIG. 6 is a flowchart illustration of processing steps for providing channel rank feedback information on first and second transmission channels wherein the channel ranks on the two channels are independent. In step 602, the measured channel rank on a downlink channel is monitored and first and second sets of measured channel rank are generated therefrom. In step 604 a test is conducted to determine whether there has been a change in the measured channel rank on the first set of measured channel rank. If the measured channel rank on the first channel rank has changed, processing proceeds to step 606 and a new channel rank is used to select the format for CFI reports transmitted on the first communication. If, however, the test conducted in step 604 indicates that the measured channel rank on the first channel has not changed, processing proceeds to step 608 where a test is conducted to determine whether there has been a change in the measured channel rank of the second channel. If the measured channel rank on the second channel has changed, processing proceeds to step 610 and a new channel rank is used to select the format for transmitting CFI reports on the second channel communication channel. If, however, the test conducted in step 608 indicates that the measured channel rank on the second channel has not changed, processing proceeds to step 612 where the current channel ranks for the first and second channels are used to select formats for transmitting CFI reports on the first and second channels, respectively.

In another alternate embodiment, CFI is interpreted using channel ranks that are dependent (i.e., the same) during some reporting time intervals and are independent (i.e., not forced to be the same) in other reporting time intervals. For example in a first reporting time interval, T1, the PUCCH can be configured for wideband CFI (to be used for scheduling down link control channel), while the PUSCH is configured for frequency selective CFI (to be used for scheduling down link data). During this reporting time interval, T1, channel ranks are independent. In another reporting time interval, e.g., T2, the PUCCH may be configured for frequency selective CFI (e.g., type 1, to be used for scheduling a down link data channel) while the PUSCH may be configured for frequency selective CFI (e.g., type 2, to be used for scheduling down link data). During this reporting time interval, T2, channel ranks are dependent. In this alternate embodiment, the Node B can semi-statically (over a plurality of predetermined reporting time intervals) configure the CFI reporting to work in the dependent or independent modes. In an alternate embodiment, the CFI reporting can be chosen to work in the dependent or independent modes as a function of the combination of the two CFI reporting types. For example, a parameter table may be established a priori by the user equipment device and the Node-B to provide parameters that specify the CFI reporting mode, i.e., dependent or independent mode, based on the combination of CFI reporting types. The exact reporting mode used during a predetermined time interval will then depend on the CFI reporting types over the two channels configured by the Node-B.

By now it should be appreciated that there has been disclosed a system and method for providing channel feedback information to a Node-B using rank information. In one aspect of the invention, a method comprises: receiving a first set channel feedback information (CFI), including a first rank report, from a user equipment device on a first communication channel; receiving a second set of CFI, including a second rank report, from the user equipment device on a second communication channel; comparing the first and second rank reports to determine the most recent rank report; and using the most recent rank report to interpret CFI reports. In an embodiment of the invention, the first set of CFI is transmitted on a physical uplink shared channel (PUSCH). In another embodiment of the invention, the second communication channel is a physical uplink control channel (PUCCH).

In another aspect of the invention the method comprises: receiving a first set of CFI, including a first rank report, from a user equipment device on a first communication channel; receiving a second set of CFI, including a second rank report, from the user equipment device on a second communication channel; using the first rank report to interpret the CFI transmitted using the first communication channel; and using the second rank report to interpret the CFI transmitted using the second communication channel.

In yet another aspect of the invention, a base station transceiver is provided, wherein the base station transceiver comprises: a channel feedback information report decoder operable to receive a first CFI report, including a first rank report, from a user equipment device on a first communication channel, to receive a second set of CFI, including a second rank report, from the user equipment device on a second communication channel, and further operable to compare the first and second rank reports to determine the most recent rank report; and processing logic operable to use the most recent rank report to interpret CFI reports.

In yet another aspect of the invention a base station transceiver is provided, wherein the transceiver comprises: a channel feedback information report decoder operable to receive a first CFI report, including a first rank report, from a user equipment device on a first communication channel, to receive a second set of CFI, including a second rank report, from the user equipment device on a second communication channel, and processing logic operable to use the first rank report to interpret the CFI transmitted using the first communication channel and use the second rank report to interpret the CFI transmitted using the second communication channel.

The methods and systems for an efficient feedback methodology to provide channel feedback information to a Node-B using rank information, as shown and described herein, may be implemented in software stored on a computer-readable medium and executed as a computer program on a general purpose or special purpose computer to perform certain tasks. For a hardware implementation, the elements used to perform various signal processing steps at the Node-B (e.g., coding and modulating the data, precoding the modulated signals, preconditioning the precoded signals, extracting channel rank reports from the uplink messages and so on) and/or at the receiver (e.g., recovering the transmitted signals, demodulating and decoding the recovered signals, detecting changes in the user equipment device state that require feedback of channel-side information and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the Node-B and user equipment device may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various feedback systems and methods for using same, the present invention is not necessarily limited to the example embodiments illustrated herein. For example, various embodiments of a channel rank feedback system and methodology disclosed herein may be implemented in connection with various proprietary or wireless communication standards, such as IEEE 802.16e, 3GPP-LTE, DVB and other multi-user systems, such as wireless MIMO systems, though channel rank information can also be used in non-MIMO communication systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus, comprising:
one or more processing elements configured to:
receive a configuration comprising a plurality of channel feedback information (CFI) reporting types including associated parameters;
generate a first set of channel feedback information according to a first CFI reporting type of the plurality of received CFI reporting types;
generate a second set of channel feedback information according to a second CFI reporting type of the plurality of received CFI reporting types;
generate first and second rank reports, corresponding to the first and second CFI reporting types, respectively;
determine whether the first and the second CFI reporting types are configured to be independent or dependent rank reporting modes based on the associated parameters;
in response to the CFI reporting types having dependent reporting rank modes, use the most recent rank report corresponding to either the first or second CFI reporting types to process the first CFI;
in response to the CFI reporting types having independent reporting rank modes, use the most recent rank report corresponding to the first CFI reporting type to process the first CFI; and
transmit the processed first CFI.

2. The apparatus of claim 1, wherein the received configuration including associated parameters includes an indication of whether the first and the second CFI reporting types are configured to have dependent rank reporting modes.

3. The apparatus of claim 1, wherein the first CFI reporting type uses a physical uplink control channel (PUCCH) and the second CFI reporting type uses a physical uplink shared channel (PUSCH).

4. The apparatus of claim 1, wherein the first CFI reporting type is a wideband report and the second CFI reporting type is a frequency-selective report.

5. The apparatus of claim 1, wherein the first CFI reporting type is periodic and the second CFI reporting type is aperiodic.

6. A mobile device, comprising:
one or more antennas;
one or more wireless radios configured to communicate via the one or more antennas; and
one or more processing elements configured to:
receive a configuration comprising a plurality of channel feedback information (CFI) reporting types including associated parameters;
generate a first set of channel feedback information according to a first CFI reporting type of the plurality of received CFI reporting types;
generate a second set of channel feedback information according to a second CFI reporting type of the plurality of received CFI reporting types;
generate first and second rank reports, corresponding to the first and second CFI reporting types, respectively;
determine whether the first and the second CFI reporting types are configured to be independent or dependent rank reporting modes based on the associated parameters;
in response to the CFI reporting types having dependent reporting rank modes, use the most recent rank report corresponding to either the first or second CFI reporting types to process the first CFI;
in response to the CFI reporting types having independent reporting rank modes, use the most recent rank report corresponding to the first CFI reporting type to process the first CFI; and
transmit the processed first CFI.

7. The mobile device of claim 6, wherein the received configuration including associated parameters includes an indication of whether the first and the second CFI reporting types are configured to have dependent rank reporting modes.

8. The mobile device of claim 6, wherein the first CFI reporting type uses a physical uplink control channel (PUCCH) and the second CFI reporting type uses a physical uplink shared channel (PUSCH).

9. The mobile device of claim 6, wherein the first CFI reporting type is a wideband report and the second CFI reporting type is a frequency-selective report.

10. The mobile device of claim 6, wherein the first CFI reporting type is periodic and the second CFI reporting type is aperiodic.

11. A method, comprising:
  determining, by a base station, a configuration comprising a plurality of channel feedback information (CFI) reporting types including associated parameters that indicate whether respective first and second CFI reporting types are configured to be independent or dependent rank reporting modes;
  receiving, by the base station, a first set of channel feedback information according to a first CFI reporting type of the plurality of received CFI reporting types;
  receiving, by the base station, a second set of channel feedback information according to a second CFI reporting type of the plurality of received CFI reporting types;
  receiving, by the base station, first and second rank reports, corresponding to the respective first and second CFI reporting types;
  selecting, by the base station based on whether the CFI reporting modes have dependent or independent reporting rank modes, whether to process the first set of channel feedback information:
    using a most recent rank report corresponding to either the first or second CFI reporting type; or
    using a most recent rank report corresponding to the first CFI reporting type.

12. The method of claim 11, further comprising:
  scheduling one or more downlink control resources based on the processed channel feedback information.

13. The method of claim 11, wherein the determined configuration including associated parameters includes an indication of whether the first and the second CFI reporting types are configured to have dependent rank reporting modes.

14. The method of claim 11, wherein the first CFI reporting type uses a physical uplink control channel (PUCCH) and the second CFI reporting type uses a physical uplink shared channel (PUSCH).

15. The method of claim 11, wherein the first CFI reporting type is a wideband report and the second CFI reporting type is a frequency-selective report.

16. The method of claim 11, wherein the first CFI reporting type is periodic and the second CFI reporting type is periodic.

* * * * *